United States Patent [19]

Grosbard

[11] Patent Number: 4,824,701
[45] Date of Patent: Apr. 25, 1989

[54] METHOD AND COMPOSITION FOR ENHANCING PROPERTIES OF BARRIER COATINGS

[76] Inventor: Gregory Grosbard, 16353 N.W. 57th Ave., Miami, Fla. 33014

[21] Appl. No.: 155,379

[22] Filed: Feb. 12, 1988

Related U.S. Application Data

[63] Continuation-in-part of Ser. No. 903,039, Sep. 2, 1986, Pat. No. 4,752,429.

[51] Int. Cl.[4] .............................. B05D 3/02; C08J 3/20
[52] U.S. Cl. .................................. 427/385.5; 524/27; 524/58; 524/732
[58] Field of Search ................ 427/385.5; 524/27, 58, 524/732

[56] References Cited

U.S. PATENT DOCUMENTS

| | | | |
|---|---|---|---|
| 3,639,312 | 2/1972 | Turner | 264/1.6 X |
| 4,684,573 | 8/1987 | Mueller et al. | 427/385.5 X |
| 4,752,429 | 6/1988 | Grosbard | 264/141 |

*Primary Examiner*—Michael Lusignan
*Attorney, Agent, or Firm*—Fleit, Jacobson, Cohn & Price

[57] ABSTRACT

High oxygen barrier characteristics over a wide range of humidity conditions is achieved with a coating formed by an ethylene vinyl alcohol copolymer resin having a sugar additive uniformly dispersed therein by dissolution with the resin in a liquid carrier forming a solvent of a coating solution through which the additive modified resin coating is applied to a passive substrate.

15 Claims, 1 Drawing Sheet

METHOD AND COMPOSITION FOR ENHANCING PROPERTIES OF BARRIER COATINGS

BACKGROUND OF THE INVENTION

Field of the Invention

This invention relates generally to improving the properties of synthetic resins and more particularly to improving oxygen barrier properties thereof by use of an additive, as in the case of thermoplastic polymers disclosed and claimed in my prior copending application, U.S. Ser. No. 903,039, filed Sept. 2, 1986 now U.S. Pat. No. 4,752,429, patented June 21, 1988, to which the present application is a continuation-in-part.

Thermoplastic or resin films having barrier properties are well known, including those such as ethylene vinyl-alcohol copolymers (EVOH) and vinylidene chloride copolymers (SARAN) having good gas-barrier properties. However, such barrier films are humidity sensitive so that their desirable gas barrier properties are limited to low humidity conditions as explained, for example, in U.S. Pat. No. 4,684,573 to Mueller et al. A multi-layer coating is proposed by the latter patent, to reduce humidity sensitivity.

As between the aforementioned barrier films, the EVOH films are better oxygen barriers under low humidity conditions and are bio-degradable. The EVOH barrier films are generally applied in a liquid carrier by dipping, spraying or coating on a passive substrate, such as a packaging film or plastic container in order to impart thereto a gas impermeable characteristic. By way of example, EVOH barrier films now in commercial use are applied as coating emulsions containing a water diluted alcohol solvent formed either by isopropanol alcohol and/or n-propanol alcohol in solution or by an alcohol-formic acid solution as the liquid carrier with a 6% by weight content of EVOH solids to achieve the desirable barrier properties with a predetermined barrier coating density and thickness. Such barrier coating emulsions are, however, unstable because of gelatinization that occurs at room temperature at a rate which increases with decreasing temperature.

It is therefore an important object of the present invention to provide a single layer gas barrier coating of the aforementioned type which is less sensitive to humidity, particularly in regard to its oxygen permeability so as to exhibit low oxygen transmission rates over a wider range of humidity conditions.

A further object is to provide a gas barrier coating which is applied in a liquid carrier that is more easily processed and is more stable insofar as solid resin distribution is concerned, so as to enhance its application and use.

SUMMARY OF THE INVENTION

In accordance with the present invention, the solid resin content, such as EVOH, within a coating emulsion having an alcohol solvent as the liquid carrier, is increased to 12%, for example, and undergoes a dissolution operation so as to produce a modified barrier coating in liquid solution. A sugar additive is introduced in solution with both a water diluted acid and the same alcohol solvent to form the modified barrier coating solution. The sugar additive, such as sucrose, is separately dissolved in its acid solution to form between 1% and 5% of such solution before the acid solution is mixed at a 1:3 ratio with the alcohol solvent. Equal parts of the separately formed additive-acid-alcohol solution is then mixed with the alcohol solvent having the increased quantity of resin dissolved therein, to form the resulting modified resin barrier coating solution, which has a ratio of resin to sucrose in the range of 38.5 to 48.

The foregoing modified coating solution was found to be more stable in maintaining the resin and sucrose additive homogeneously dispersed in solution within the liquid carrier formed by the water diluted acid and alcohol solvent. The limited quantity of sugar additive was found to be effective in substantially widening the range of humidity conditions under which oxygen permeability is low for a single layer coating, without degrading the plastic substrate.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENTS

Figure 1:
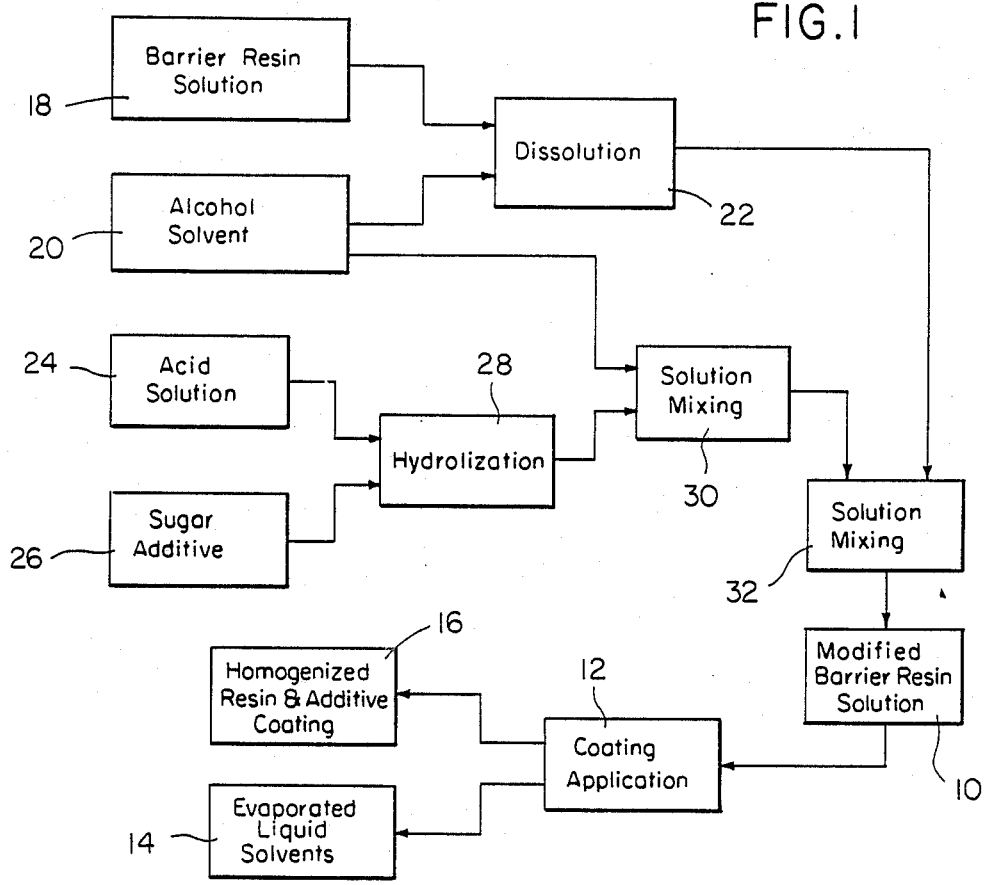
FIG. 1 is a block diagram depicting the process of the present invention.

In accordance with the present invention, a stabilized barrier coating solution, referred to by reference numeral 10 in FIG. 1, is applied to a passive substrate surface by any suitable application method 12 such as dipping, spraying or coating. Upon drying of the barrier coating solution so applied, the solvent liquid carrier 14 in the form of water, acid and alcohol is evaporated leaving a single layer barrier coating 16 on the substrate in the form of resin solids with additive solids uniformly dispersed therein as diagrammed in FIG. 1.

The resin solids utilized are of a well known composition as aforementioned, in a de-ionized water solution 18 as depicted in FIG. 1. The solids in the water solution are fully dissolved in an alcohol solvent 20 by complete dissolution involving, for example, agitation at 90° C. for a period of at least one hour during a step 22 of the process. The relative quantity of the resin solids in the solution resulting from dissolution step 22 is substantially greater than those of coatings in liquid carriers heretofore prepared, involving the same resin coating solids. For example, 6% by weight of ethylene-vinyl-alcohol copolymer (EVOH) was heretofore utilized as the resin solids in a comparable barrier coating emulsion, whereas 12% by weight would be utilized in solution in accordance with the present invention. The use of 6% by weight of the EVOH content was heretofore recommended to achieve a dry coating of 2 mg. per sq. inch of a 0.4 mg. thickness to meet desired requirements of oxygen permeability, aroma, fragrance, etc.

With continued reference to FIG. 1, a water diluted acid solution 24 is separately prepared and a sugar additive 26 dissolved therein so as to undergo a hydrolization step 28 until the additive is completely dissolved. In accordance with the present invention, the relative quantity of the sugar additive 26 in the acid solution 24 is between 1% and 5% by weight. Further, the sugar additive-acid solution is hydrolized for a minimum period of one hour and then mixed with the same alcohol solvent 20 as indicated at 30 in FIG. 1, within 24 hours. The acid-additive solution resulting from step 28 depicted in FIG. 1, is mixed with the alcohol solvent 20 at a ratio of one part to three parts. The acid-sugar-additive-alcohol solution resulting from the mixing step 30 is then mixed, in equal proportions, with the solution resulting from step 22, as indicated by reference numeral 32 in FIG. 1 to produce the coating solution 10 aforementioned. The solution 10 may be applied at room temperature or between 40° C. to 60° C.

Application of the additive modified, barrier coating solution 10 as indicated by step 12 in FIG. 1, has the advantage over prior art coating emulsions in that it is easier to apply because of substantially total solution of the solids therein as distinguished from particulate suspension. Also, the additive modified solution 10 has a pH factor of 2.8 as compared to the pH factor of 6.8 for comparable prior art coating emulsions having EVOH barrier solids suspended therein.

Figure 2:
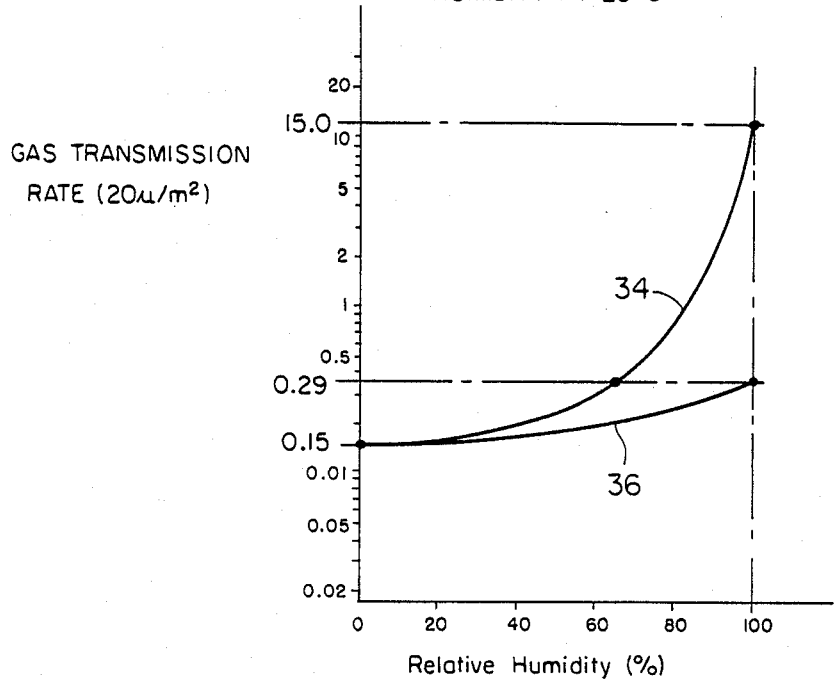
FIG. 2 is a graphical illustration comparing oxygen permeability of prior art gas barrier films with gas barrier films made in accordance with the present invention, under varying relative humidity conditions.

FIG. 1 graphically depicts by curve 34 the oxygen permeability property of a barrier coating film formed by EVOH solids under atmospheric temperature conditions of 20° C. Although such EVOH barrier coating film exhibits substantially lower oxygen transmission rates than other barrier coating films made of PVDC, Nitrite, Nylon, Polyester, Polypropylene, Polyethylene and Polystyrene, oxygen permeability sharply increases with an increase in relative humidity from a low transmission rate of 0.15 at 0% humidity to 15.0 at 100% humidity. Thus, a loss of barrier properties between 0% and 100% humidity by a factor of 150 occurs in connection with such prior art type of EVOH oxygen barrier films. In contrast thereto, a modified EVOH type barrier film in accordance with the present invention loses its oxygen barrier property by a factor of only 3.5 between 0% and 100% humidity, as depicted by curve 36 in FIG. 2.

EXAMPLE 1

An unmodified EVOH resin is utilized as the barrier solids in one specific embodiment of the invention as hereinbefore described, wherein the alcohol solvent 20 is isopropanol alcohol and/or n-propanol alcohol mixed with de-ionized water at a ratio 50% to 65% by weight of the alcohol. The sugar additive 26 is sucrose (SCL) forming 1% by weight of its solution with the de-ionized water diluted acid solution 24. The acid solution 24 has 2% by weight of hydrochloric acid and 31.45% by weight of Baume dissolved therein.

The barrier coating solution 10 as referred to in FIG. 1 will accordingly contain EVOH resin solids and sucrose particles homogenized therein at a weight ratio of 48 to 1, where a 1% SCL-acid solution is utilized. For a 5% SCL-acid solution, the ratio of EVOH to SCL in the coating solution 10 will correspondingly be approximately 38.5.

EXAMPLE 2

The process of making and the composition of the coating solution 10 as hereinbefore described, is the same as described under Example 1, except that the alcohol solvent 20 is formed by 55% by weight of alcohol, 15% by weight of formic acid and 30% by weight of de-ionized water.

EXAMPLE 3

According to yet another specific embodiment of the invention, the modified barrier coating solution 10 is formed from the barrier resin solution 18, the alcohol solvent 20, the acid solution 24 and the sugar additive 26 as hereinbefore described, in accordance with the following tabulations:

| Barrier Resin Solution (18) | Alcohol Solvent (20) (% ingredients) | | | Sugar additive (26) | Acid Solution (24) | Mixture proportion of Solution (10) | |
|---|---|---|---|---|---|---|---|
| | N (Normal) Proponol | Ethonol | de-ionized water | | | Sugar additive and Acid Solution (26) + (24) | Alcohol Solvent (20) |
| 6% EVOH | 50 | 20 | 24 | 1–15 grams of Sucrose | 88% Formic acid | 50 ml (1 part) | 4000 ml (80 parts) |

In the foregoing formulation, the sucrose content in the acid-additive solution is varied within the limits indicated to achieve desired results. Once the sucrose is diluted in the acid solution 24 with or without agitation the solution remains stable and unaffected by ultra-violet radiation indefinitely. The resulting coating solution 10 has a pH value of 2.6 which remains non-variable indefinitely.

Coating solutions produced in accordance with the foregoing embodiments of the invention require less corona treatment of certain substrates for successful application. Also, the coating solution remains stable for an indefinite period of time despite variations in temperature.

The foregoing is considered as illustrative only of the principles of the invention. Further since numerous modifications and changes will readily occur to those skilled in the art, all suitable modifications and equivalents may be resorted to, falling within the scope of the invention.

What is claimed as new is as follows:

1. A process for improving gas impermeability properties of a barrier formed by a particulate resin applied to a substrate, comprising:
    (a) introducing a sugar additive to said resin at a ratio of the resin to the additive of about 38.5 to 48;
    (b) forming a solution of the resin and the additive in a solvent; and
    (c) applying said solution to the substrate for coating thereof with the resin and the additive uniformly dispersed therein upon evaporation of the solvent.

2. The process as defined in claim 1 wherein said resin is ethylene-vinyl-alcohol copolymer and said sugar additive is sucrose.

3. The process as defined in claim 2 wherein the solution is formed by: initially dissolving the resin in a water diluted alcohol; separately dissolving the additive in a water diluted acid; and mixing the water diluted alcohol and acid having the resin and the additive respectively dissolved therein to form said solvent.

4. The process as defined in claim 3 wherein the resin forms 12% by weight of the water diluted alcohol in which the resin is initially dissolved.

5. The process as defined in claim 4 wherein the additive forms between 1% and 5% of the diluted acid within which the additive is separately dissolved.

6. The process as defined in claim 1 wherein the solution is formed by: initially dissolving the resin in a water diluted alcohol; separately dissolving the additive in a water diluted acid; and mixing the water diluted alcohol and acid having the resin and the additive respectively dissolved therein to form said solvent.

7. The process as defined in claim 6 wherein the resin forms 12% by weight of the water diluted alcohol in which the resin is initially dissolved.

8. In a process for making a single layer barrier coating formed by ethylene-vinyl-alcohol copolymer in an alcohol composition applied to a passive substrate, the steps of: dissolving sucrose in an acid solution; mixing the alcohol composition with the acid solution having the sucrose dissolved therein to form a solvent; and dissolving the barrier coating in said solvent for uniform dispersal of the sucrose within the ethylene-vinyl-alcohol copolymer before application to the substrate.

9. The process as defined in claim 8 wherein the ratio of the ethylene-vinyl-alcohol copolymer to the sucrose dispersed therein is in a range of about 38.5 to 48.

10. The process for modifying a coating of ethylene-vinyl-alcohol copolymer in a liquid carrier to improve the barrier properties thereof, including the steps of: increasing the relative quantity of the ethylene-vinyl-alcohol copolymer in said liquid carrier; and dissolving a sugar additive together with said coating in the liquid carrier to produce a solution within which the additive is uniformly dispersed.

11. The process as defined in claim 10 wherein the ratio of the ethylene-vinyl-alcohol copolymer to the additive in the solution is from about 38.5 to 48.

12. The process as defined in claim 11 wherein the quantity of the ethylene-vinyl-alcohol copolymer in the liquid carrier is increased to 12%.

13. The process as defined in claim 12 wherein the sugar additive is dissolved in the liquid carrier by: initially dissolving the sugar additive in water diluted acid and then mixing the acid with the liquid carrier.

14. The process as defined in claim 11 wherein the sugar additive is dissolved in the liquid carrier by: initially dissolving the sugar additive in a water diluted acid and then mixing the acid with the liquid carrier.

15. The process as defined in claim 10 wherein the quantity of the ethylene-vinyl-alcohol copolymer in the liquid carrier is increased to 12%.

* * * * *